US008624868B2

(12) United States Patent
Chang et al.

(10) Patent No.: US 8,624,868 B2
(45) Date of Patent: Jan. 7, 2014

(54) SYSTEM FOR DISPLAYING IMAGES INCLUDING A TOUCH DISPLAY PANEL (75) Inventors: Ting-Kuo Chang, Hsinchu (TW); Kai-Chieh Yang, Niaosong Township, Kaohsiung County (TW)

(73) Assignee: Chimei Innolux Corporation, Chu-Nan (TW)

( * ) Notice: Subject to any disclaimer, the term of this patent is extended or adjusted under 35 U.S.C. 154(b) by 277 days.

(21) Appl. No.: 12/707,646

(22) Filed: Feb. 17, 2010

(65) Prior Publication Data
US 2010/0321311 A1    Dec. 23, 2010

(30) Foreign Application Priority Data

Feb. 23, 2009  (TW) ................. 98105609 A (51) Int. Cl.
*G06F 3/041* (2006.01)
*G06F 3/045* (2006.01)
(52) U.S. Cl.
USPC ......................................... 345/174; 345/173
(58) Field of Classification Search
USPC ........ 345/173–178; 349/12; 178/18.01–20.04
See application file for complete search history.

(56) References Cited

U.S. PATENT DOCUMENTS

| 5,438,443 | A | * | 8/1995 | Taniguchi et al. | 349/155 |
| 2007/0268243 | A1 | * | 11/2007 | Choo et al. | 345/104 |
| 2007/0279395 | A1 | * | 12/2007 | Philipp et al. | 345/173 |
| 2009/0109356 | A1 | * | 4/2009 | Kitagawa | 349/33 |
| 2009/0322702 | A1 | * | 12/2009 | Chien et al. | 345/174 |
| 2010/0001973 | A1 | * | 1/2010 | Hotelling et al. | 345/174 |
| 2010/0026659 | A1 | * | 2/2010 | Long et al. | 345/174 |

FOREIGN PATENT DOCUMENTS

CN             101339314              1/2009

* cited by examiner

*Primary Examiner* — Bipin Shalwala
*Assistant Examiner* — Ryan A Lubit
(74) *Attorney, Agent, or Firm* — Liu & Liu (57) ABSTRACT A system for displaying images including a touch display panel is provided. The touch display panel includes a first substrate. An electrode array is disposed on the first substrate, and the electrode array includes a first touch area. A first common electrode layer is disposed on the electrode array. A first dielectric layer is disposed between the electrode array and the first common electrode layer.

20 Claims, 8 Drawing Sheets

SYSTEM FOR DISPLAYING IMAGES INCLUDING A TOUCH DISPLAY PANEL

CROSS REFERENCE TO RELATED APPLICATIONS

This Application claims priority of Taiwan Patent Application No. 98105609, filed on Feb. 23, 2009, the entirety of which is incorporated by reference herein.

BACKGROUND OF THE INVENTION

1. Field of the Invention

The invention relates to a system for displaying images including a display panel, and more particularly to a touch display panel with an in-cell capacitive induction touch structure.

2. Description of the Related Art

In general, induction methods of in-cell touch display panels comprise an optical induction or an electrostatic induction method. The optical induction touch panel utilizes photo sensors at the pixels to respond to ambient lights, such that the functions of touch panels can be achieved. However, optical induction is easily affected by the brightness of ambient lights and limited by the area of a pixel. When the resolution of an optical induction touch display panel is high and the area of a pixel is small, signals sensed by optical induction are reduced. Additionally, aperture ratio of the optical induction touch display panel decreases due to the photo sensors at the pixels. Thus, problems exist for the optical induction touch display panels.

Figure 1:
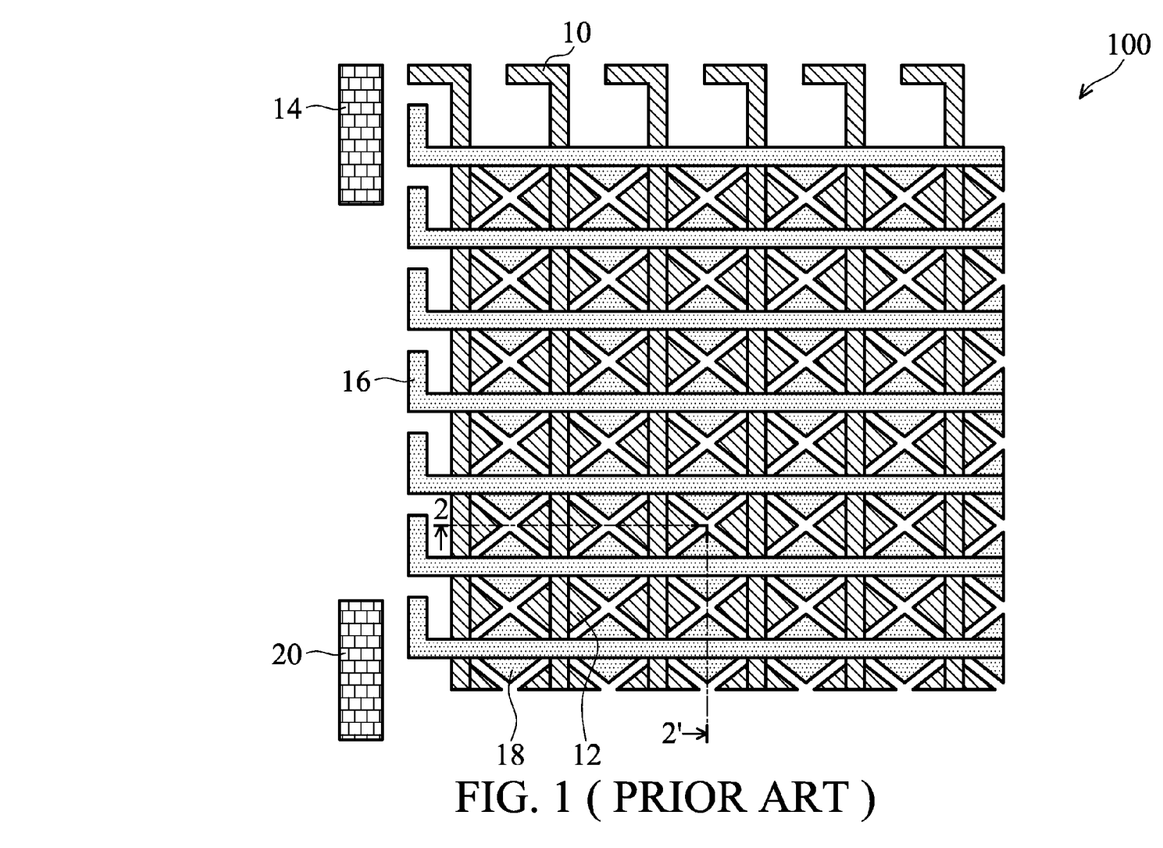
FIG. 1 is a schematic plane view of a conventional electrostatic induction touch panel.

Another type of touch panel is an in-cell electrostatic induction touch panel, which utilizes capacitance produced by touching of the touch panel to achieve the functions of touch panels. Referring to FIG. 1, a plane view of a conventional electrostatic induction touch panel 100 is shown. The conventional electrostatic induction touch panel 100 has a plurality of rhombus electrically conductive structures 12 and 18. The rhombus electrically conductive structures 12 are arranged in a column, which are connected by an X-axis electrode 10 and coupled to an X-axis circuit 14. The rhombus electrically conductive structures 18 arranged in a row are connected by a Y-axis electrode 16 and coupled to a Y-axis circuit 20. The rhombus electrically conductive structures 12 and the X-axis electrode 10 are disposed in the same conductive layer. The rhombus electrically conductive structures 18 and the Y-axis electrode 16 are disposed in a conductive layer other than the rhombus electrically conductive structures 12 and the X-axis electrode 10. The materials of the conductive layers may be indium tin oxide (ITO). Therefore, the conventional electrostatic induction touch panel 100 needs two ITO conductive layers therein.

Figure 2:
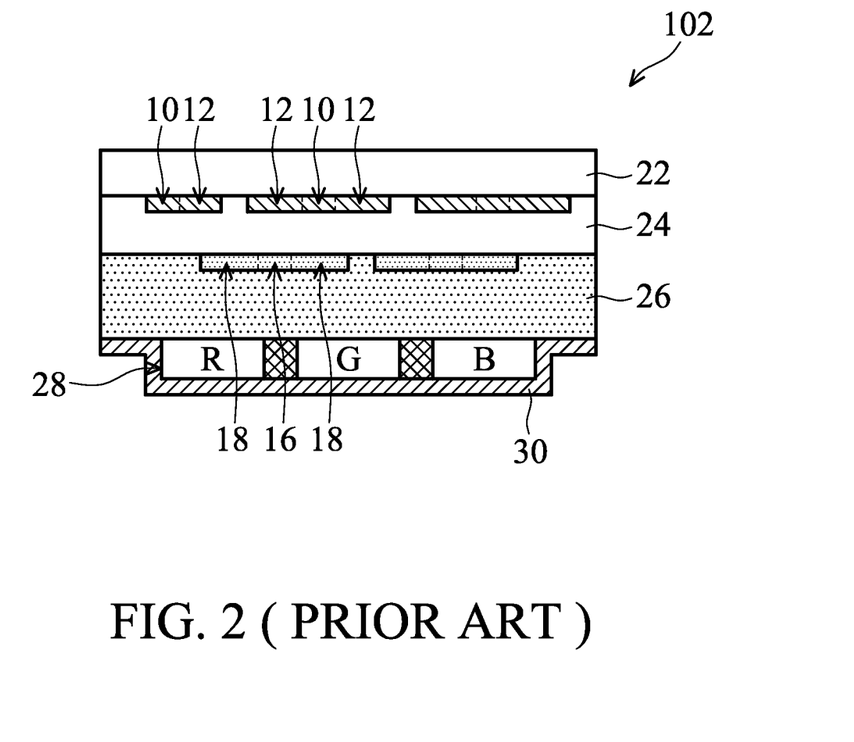
FIG. 2 is a schematic cross section of an upper substrate of a conventional electrostatic induction touch panel.

Referring to FIG. 2, a cross section of an upper substrate 102 of the conventional electrostatic induction touch panel 100 along the line 2-2' of FIG. 1 is shown. The upper substrate 102 has a capacitor structure required by the electrostatic induction touch panel therein. First, the X-axis electrode 10 and the rhombus electrically conductive structures 12 are formed on a glass substrate 22, and the X-axis electrode 10 is covered by a dielectric layer 24. Then, the Y-axis electrode 16 and the rhombus electrically conductive structures 18 are formed on the dielectric layer 24. A dielectric layer 26 is formed to cover the Y-axis electrode 16 and the rhombus electrically conductive structures 18. Next, a color filter layer 28 is formed on the dielectric layer 26 and a common electrode layer 30 is formed on the color filter layer 28 and the dielectric layer 26.

The functions of the electrostatic induction touch panels are achieved by detecting capacitance produced by touching of the touch panel, wherein the detected capacitance is provided from the touching areas and the electrically conductive layers of the touch panel. However, the conventional in-cell electrostatic induction touch panel 100 has two conductive layers, for example, the electrodes 10 and 16, such that parasitic capacitances are produced between the two conductive layers 10 and 16 and the common electrode layer 30. Additionally, there is only one dielectric layer 26 disposed between the Y-axis electrode 16 and the common electrode layer 30, such that the parasitic capacitance produced is large. The actually detected capacitance of the touch panel is easily interfered with by the parasitic capacitance, which reduces the sensitivity of the detected signals. Thus, the sensitivity of the detected signals of the conventional in-cell electrostatic induction touch panel 100 is poor.

Therefore, a display panel with an in-cell capacitive induction touch structure that can improve the above mentioned problems is desirable.

BRIEF SUMMARY OF THE INVENTION

The invention provides a system for displaying images including a touch display panel. The touch display panel comprises a first substrate. An electrode array is disposed on the first substrate, wherein the electrode array includes a first touch area. A first common electrode layer is disposed on the electrode array. A first dielectric layer is disposed between the electrode array and the first common electrode layer.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

In an embodiment of the invention, a touch display panel with an in-cell capacitive induction touch structure only utilizes one transparent electrode layer as touch induction areas to achieve the functions of the touch panel. In the touch display panel, the parasitic capacitance can be reduced and the sensitivity of detected signals can be enhanced. Moreover, utilizing only one layer of transparent electrode layer also can reduce the impact on the optical characters of the panel, for example, brightness, contrast, or uniformity of the displaying images of the display panel.

Figure 3:
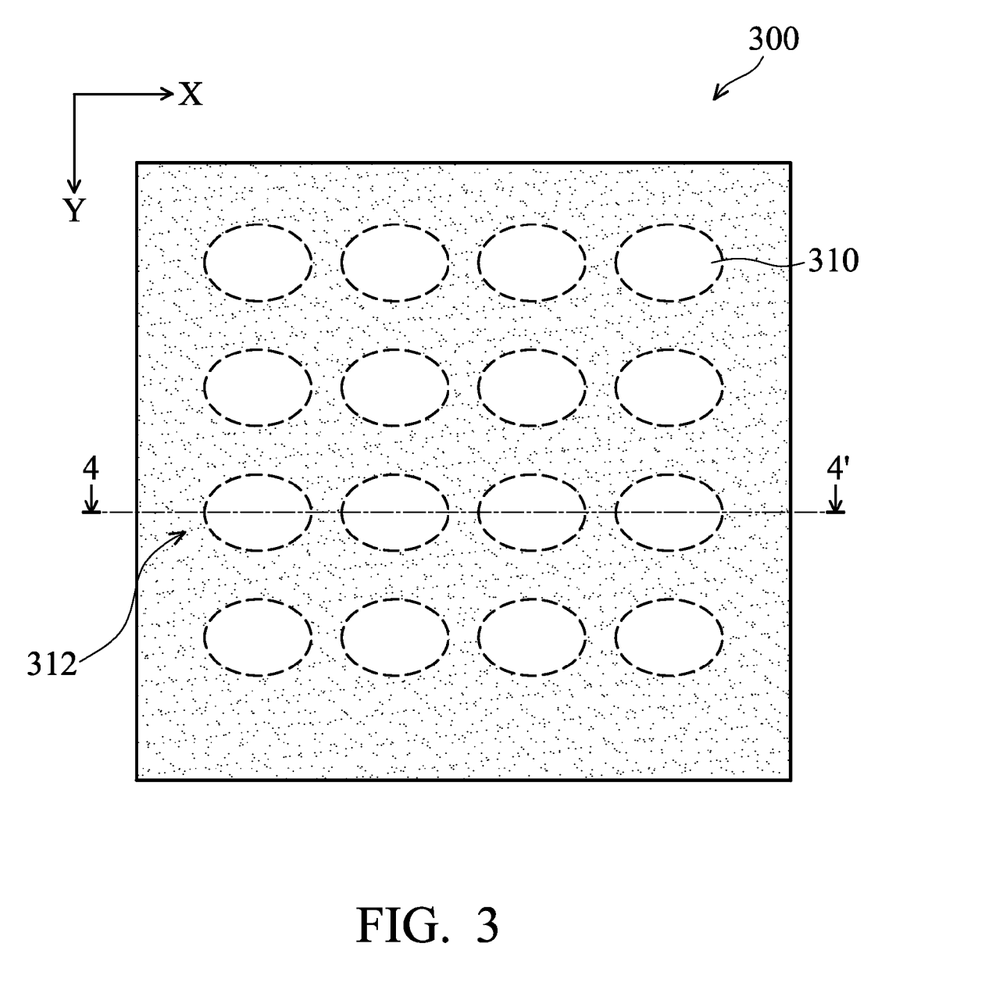
FIG. 3 is a schematic plane view of an electrode array of a touch display panel according to an embodiment of the invention.

Referring to FIG. 3, a plane view of an in-cell capacitive induction touch structure of a touch display panel 300 according to an embodiment of the invention is shown. The touch display panel 300 has a plurality of touch areas 310, which are arranged into a matrix to form an electrode array 312 and have a type of button shown on the display panel 300. In the display panel 300, the plurality of touch areas 310 at X-axis direction and that at Y-axis direction both are disposed in the same electrode layer. The touch areas 310 at X-axis and Y-axis directions are co-planar and electrically insulated with each other. In an embodiment of the invention, each touch area 310 can be a circular button, which has a diameter between about 5 to 15 mm. For example, each touch area 310 may be a circular button having a diameter of 10 mm. Although each touch area 310 shown in FIG. 3 is a circular button, one skilled in the art would understand that any one of the plurality of touch areas 310 may be a button with a shape of an ellipse, a square, a rectangle, a triangle, a polygon or any other shapes. In addition, a width of the touch area 310 may be between about 5 to 15 mm. Moreover, the electrode array 312 can be arranged by a shape of a circle, an ellipse, a square, a rectangle, a triangle, a polygon or any other shapes.

Figure 4A:
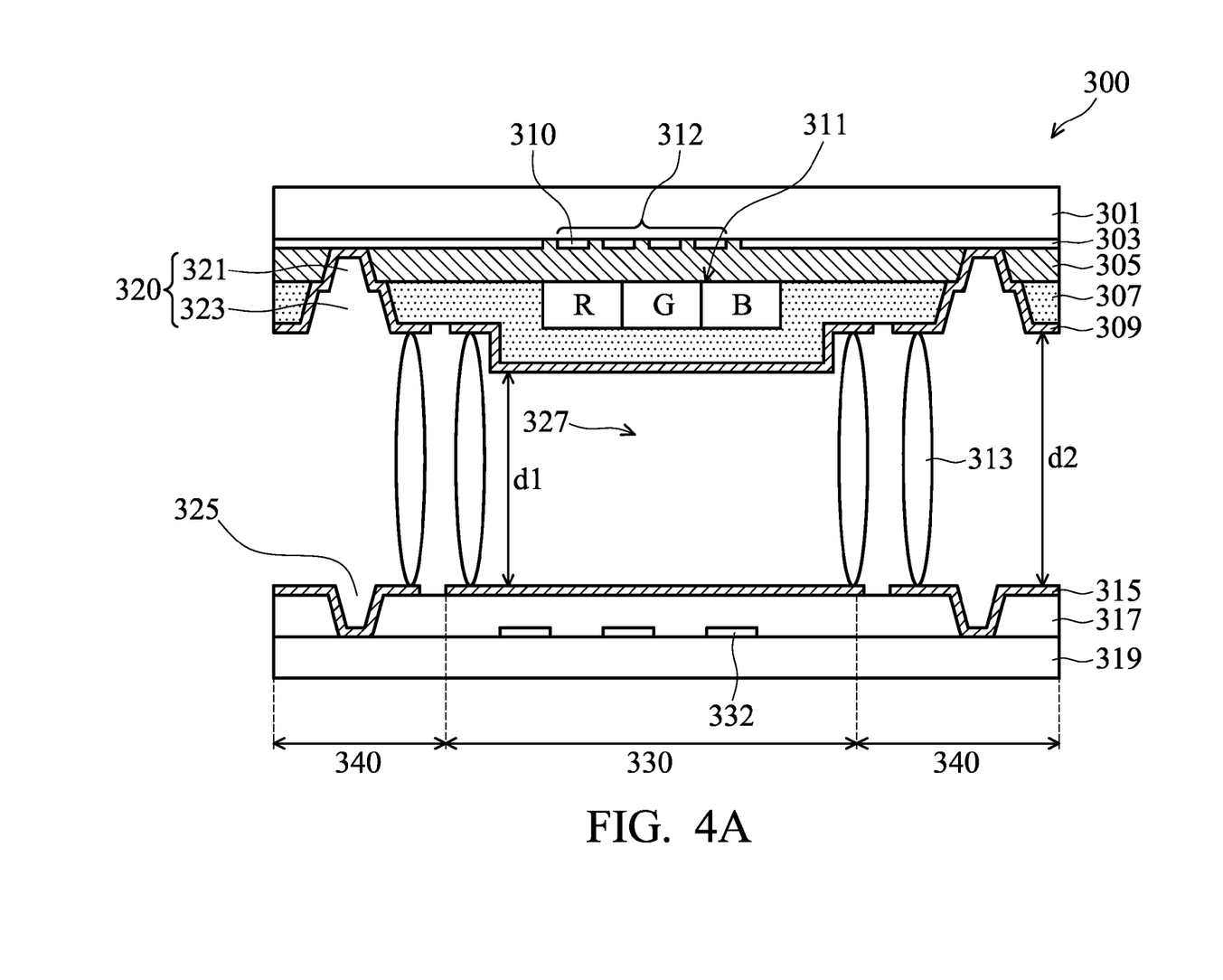
FIG. 4A is a schematic cross section of a touch display panel according to an embodiment of the invention.

Referring to FIG. 4A, a cross section of the touch display panel 300 according to an embodiment of the invention along the line 4-4' in FIG. 3 is shown. The display panel 300 has a display area 330 and a peripheral area 340 surrounding the display area 330. A transparent electrode layer 303 is formed on a first substrate 301. The transparent electrode layer 303 may be formed from indium tin oxide (ITO) or indium zinc oxide (IZO). The portions of the transparent electrode layer 303 corresponding to the display area 330 are patterned to form the plurality of touch areas 310. The touch areas 310 are used for a lower electrode of the in-cell capacitive induction touch structure. When the touch areas 310 of the touch display panel 300 are touched, for example, when user fingers (used for an upper electrode of the in-cell capacitive induction touch structure) touch the touch areas 310, a capacitance is produced between the static carried by the fingers and the touch areas 310 to form the in-cell capacitive induction touch structure.

Next, the transparent electrode layer 303 is covered with a dielectric layer 305. In an embodiment of the invention, a color filter layer 311 can be formed on the dielectric layer 305 and then the color filter layer 311 is covered with another dielectric layer 307. The dielectric layers 305 and 307 may be silicon oxides, silicon nitrides, organic compounds or combinations thereof. After forming the dielectric layers 305 and 307, openings 321 and 323 are formed in the dielectric layers 305 and 307 at the peripheral area 340 respectively. The opening 323 has a size larger than the size of the opening 321. An opening 320 comprises the openings 321 and 323 to expose the transparent electrode layer 303. Then, a common electrode layer 309 is conformally formed on the dielectric layer 307 and in the opening 320. The common electrode layer 309 may be indium tin oxide (ITO) or indium zinc oxide (IZO). The common electrode layer 309 is electrically connected to the transparent electrode layer 303 through the opening 320.

In addition, the display panel 300 further comprises a second substrate 319 disposed opposite to the first substrate 301. The second substrate 319 may be a thin film transistor (TFT) array substrate. There are electrode layers (not shown) on the second substrate 319, for example, scan lines, data lines, or common electrode lines. Moreover, there are thin film transistors 332 disposed on the second substrate 319. A dielectric layer 317 is formed on the second substrate 319. The dielectric layer 317 may be silicon oxides, silicon nitrides, organic compounds or combinations thereof. Then, an opening 325 is formed in the dielectric layer 317 at the peripheral area 340 to expose the electrode layers on the second substrate 319. Next, a common electrode layer 315 is conformally formed on the dielectric layer 317 and in the opening 325. The common electrode layer 315 may be indium tin oxide (ITO) or indium zinc oxide (IZO). The common electrode layer 315 is electrically connected to the electrode layers on the second substrate 319 through the opening 325.

In an embodiment of the invention, a liquid crystal layer 327 may be disposed between the first substrate 301 and the second substrate 319. A sealant (not shown) is disposed at the peripheral area 340 and can be used to seal the liquid crystal layer 327. The sealant includes a plurality of conductive materials 313. The conductive materials 313 contact with the common electrode layers 309 and 315, such that the transparent electrode layer 303 on the first substrate 301 can be electrically connected to the electrode layers on the second substrate 319 through the common electrode layer 309, the conductive materials 313 and the common electrode layer 315. Moreover, in an embodiment of the invention, at the display area 330, a distance d1 between the common electrode layers 309 and 315 is about 2 to 6 μm, for example, d1 may be 3 μm. At the peripheral area 340, a distance d2 between the common electrode layers 309 and 315 is about 5 to 7 μm, for example, d2 may be 5 μm.

Figure 4B:
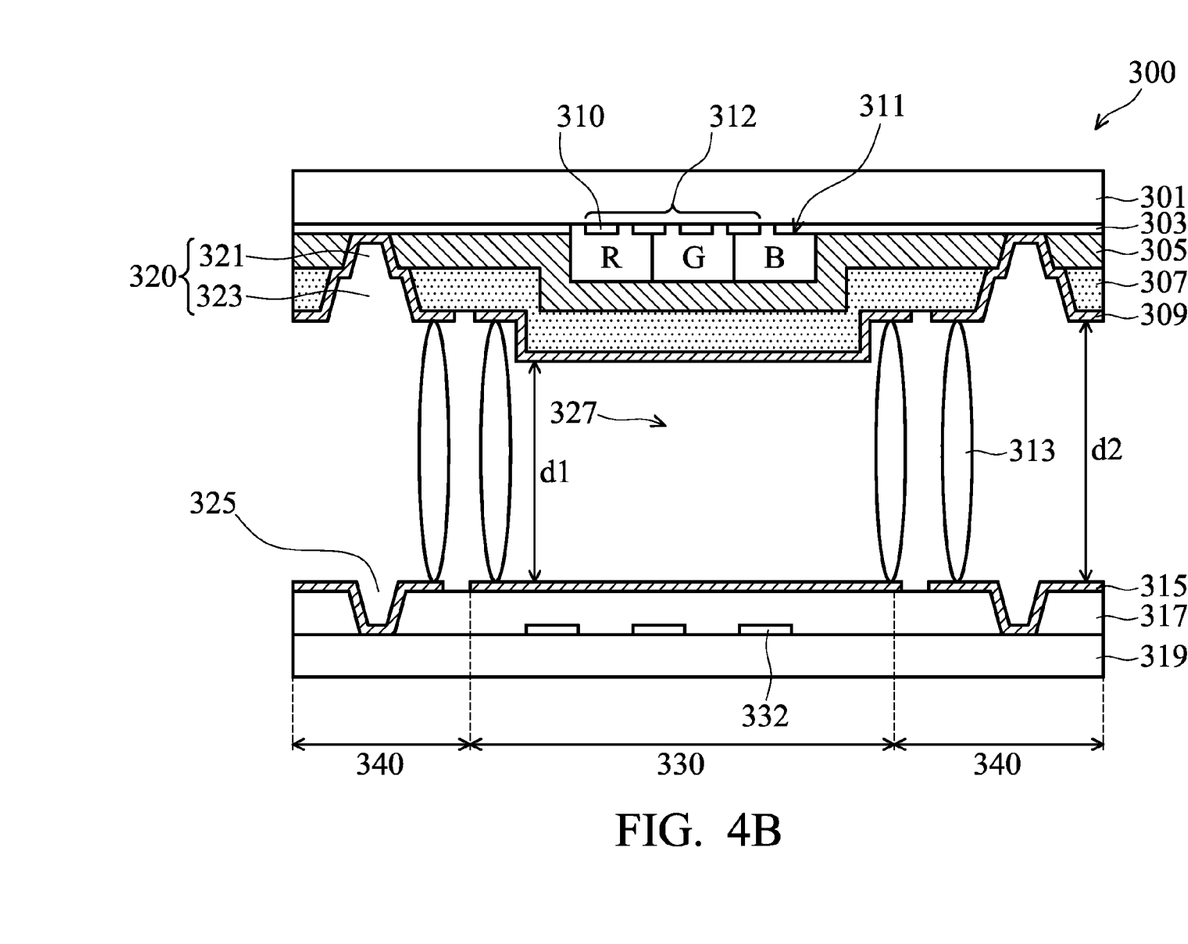
FIG. 4B is a schematic cross section of a touch display panel according to another embodiment of the invention.

Referring to FIG. 4B, a cross section of a touch display panel 300 according to another embodiment of the invention along the line 4-4' in FIG. 3 is shown. The difference between the touch display panel 300 of FIG. 4B and the touch display panel 300 of FIG. 4A is that the color filter layer 311 of the touch display panel 300 of FIG. 4B is directly disposed on the transparent electrode layer 303 and then the color filter layer 311 is covered with two dielectric layers 305 and 307. The other elements of the touch display panel 300 of FIG. 4B are the same as that of FIG. 4A, and detailed descriptions are not repeated again.

Figure 4C:
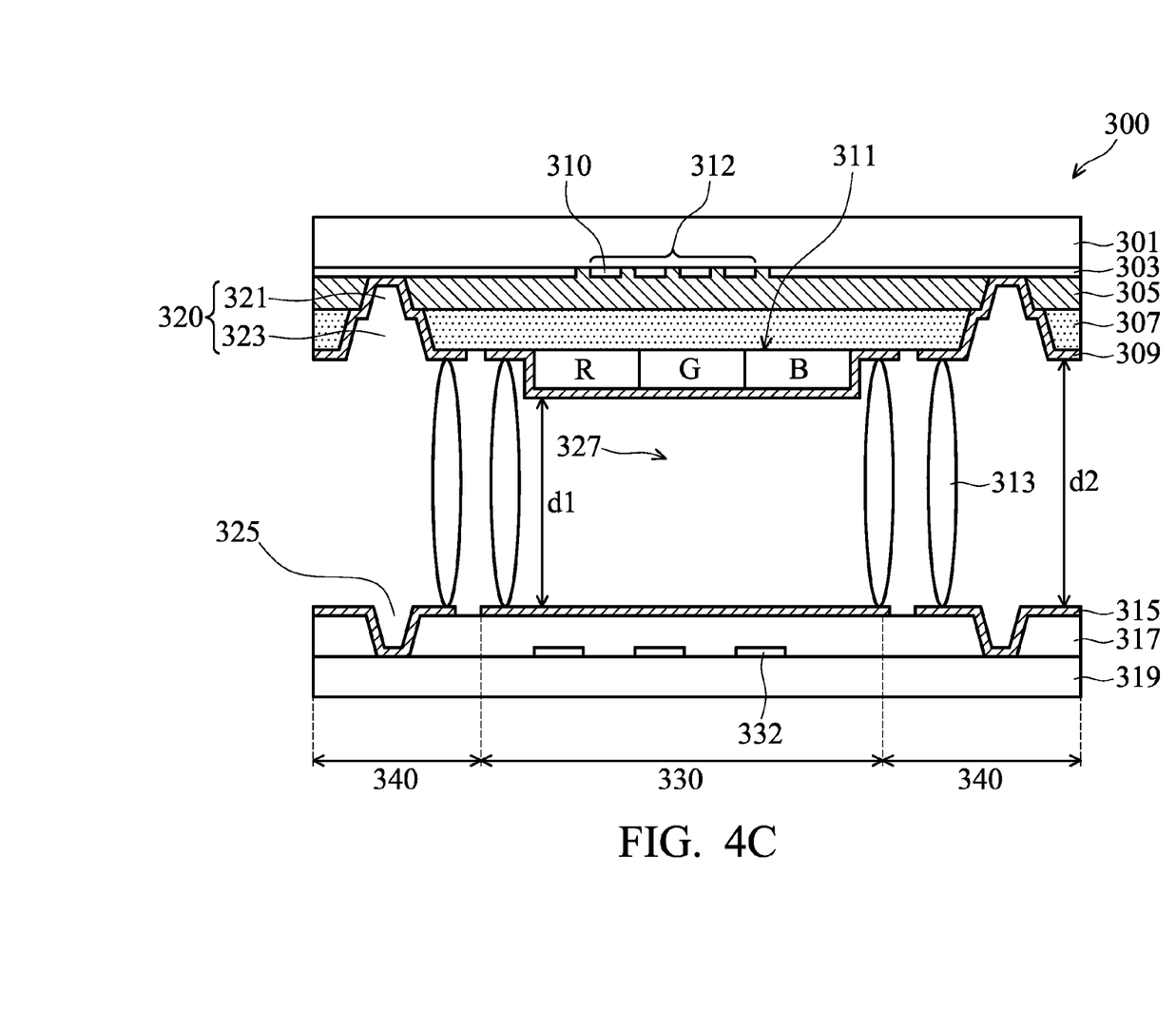
FIG. 4C is a schematic cross section of a touch display panel according to further another embodiment of the invention.

Referring to FIG. 4C, a cross section of a touch display panel 300 according to further another embodiment of the invention along the line 4-4' in FIG. 3 is shown, wherein the color filter layer 311 is disposed over the two dielectric layers 305 and 307. The other elements of the touch display panel 300 of FIG. 4C are the same as that of FIG. 4A, and detailed descriptions are not repeated again.

In an embodiment of the invention, the one layered transparent electrode layer 303 is patterned to form the touch areas 310, used for the lower electrode of the in-cell capacitive induction touch structure. Additionally, there are at least two dielectric layers 305 and 307 disposed between the transparent electrode layer 303 and the common electrode layers 309. Because the capacitance is inverse proportioned to the distance between two electrodes, in the display panel 300 of the invention, the parasitic capacitance produced between the transparent electrode layer 303 and the common electrode layers 309 is reduced by about 3 to 4 times when compared to the conventional touch panel 100 with only one dielectric layer. Therefore, the detected touch signal to noise ratio (S/N) of the touch display panel of the invention can be enhanced about 3 to 4 times than that of the conventional touch panel.

In addition, in an embodiment of the touch display panel 300 of the invention, according to the touching action from user fingers on the panel, the touch display panel 300 can determine the functions to be performed. Specifically, the touch display panel 300 can determine that the functions represented by user fingers is to draw, scroll, zoom in/out, click, or double click, etc., by manipulation of the touch areas 31 and detection of signals therefrom.

Figure 5:
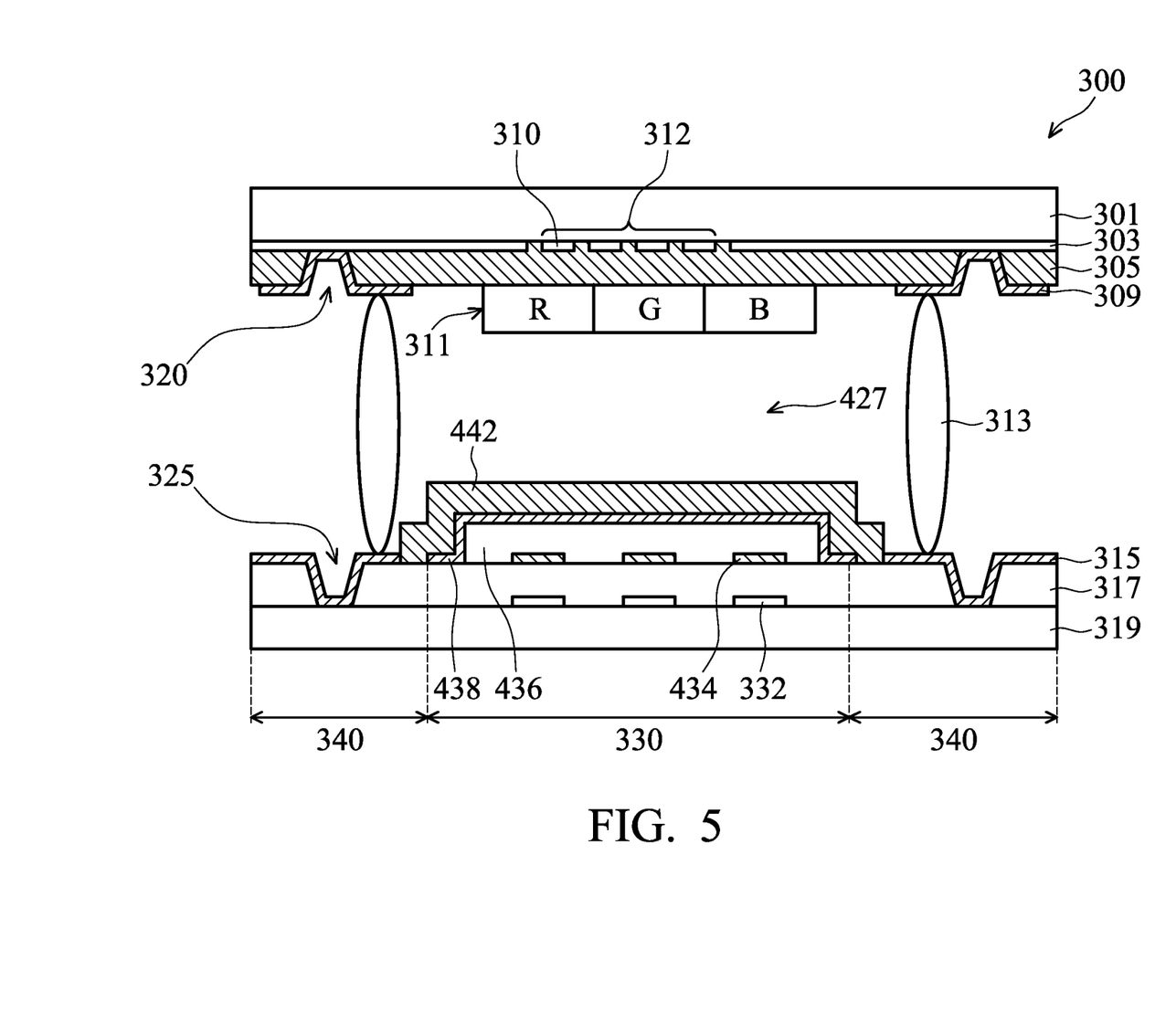
FIG. 5 is a schematic cross section of an organic light emitting diode touch display panel according to an embodiment of the invention.

Referring to FIG. 5, a cross section of an organic light emitting diode (OLED) touch display panel 300 according to an embodiment of the invention along the line 4-4' in FIG. 3 is shown. The difference between the touch display panel 300 of FIG. 5 and that of FIG. 4A is that an anode 434, a light emitting layer 436, a cathode 438 and a protective layer 442 are disposed on the second substrate 319 to form the organic light emitting diode (OLED). Additionally, a filler 427 is disposed between the first substrate 301 and the second substrate 319. In addition, the color filter layer 311 is not covered with the dielectric layer 307 and the common electrode layer 309.

Although in the above mentioned embodiments, the touch display panels are illustrated by the examples having a color filter layer therein, however, in another embodiment of the invention, the touch display panels can be formed without a color filter layer.

The touch display panels of the invention can be applied to various displays, for example, a transmissive liquid crystal display, a reflective liquid crystal display, a trans-reflective liquid crystal display, or an electroluminescent display.

Figure 6:
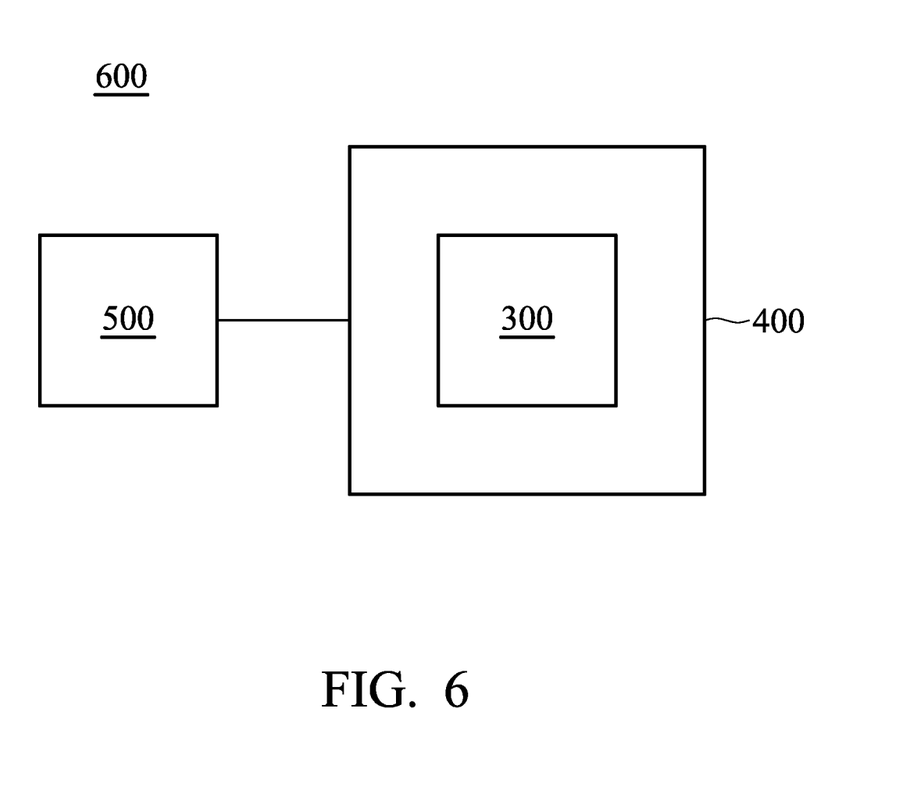
FIG. 6 schematically shows a system for displaying images including the touch display panel according to an embodiment of the invention.

Referring to FIG. 6, a system 600 for displaying images including the touch display panel according to an embodiment of the invention is shown. The system comprises a display 400, and the display 400 comprises the touch display panel 300 of the invention. The system 600 for displaying images can further comprise an electronic device. The display 400 can be a part of the electronic device. In general, the electronic device comprises the display 400 and an input unit 500. The input unit 500 is coupled to the display 400. The input unit 500 is operative to provide input to the display 400, such that the display 400 displays images. Additionally, the input unit 500 is operative to receive the first signal produced from the in-cell capacitive induction touch structure of the touch display panel 300 and transmit a second signal corresponding to the first signal to the display 400, such that the display displays images according to the touch actions. The electronic device can be a mobile phone, digital camera, personal data assistant (PDA), notebook computer, desktop computer, television, car display or portable DVD player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
 a touch display panel having a display area and a peripheral area surrounding the display area, comprising:
 a first substrate;
 a transparent electrode layer including an electrode array disposed beneath the first substrate, wherein the electrode array defines a plurality of touch areas arranged in a matrix at X-axis direction and Y-axis direction coplanar within a same electrode layer, including a first touch area;
 a first common electrode layer disposed beneath the electrode array; and
 a first dielectric layer disposed between the electrode array and the first common electrode layer;
 a second dielectric layer disposed between the first dielectric layer and the first common electrode layer;
 an opening disposed in the first and second dielectric layers at the peripheral area to expose the transparent electrode layer;
 a second substrate disposed opposite to the first substrate;
 a second common electrode layer disposed above the second substrate and facing the first common electrode layer; and
 a sealant including a plurality of conductive materials disposed between the first and second substrates,
 a color filter layer disposed between the electrode array and the first common electrode layer;
 wherein the first common electrode layer is conformally formed in the opening of the first and second dielectric layers at the peripheral area and in physical contact with the transparent electrode layer to electrically connect to the transparent electrode layer, and the first common electrode layer is further electrically connected to the second common electrode layer by the conductive materials of the sealant.

2. The system as claimed in claim 1, wherein the color filter layer is disposed between the first dielectric layer and the second dielectric layer.

3. The system as claimed in claim 1, wherein the color filter layer is disposed over the first dielectric layer and the second dielectric layer.

4. The system as claimed in claim 1, wherein the color filter layer is disposed under the first dielectric layer and the second dielectric layer.

5. The system as claimed in claim 1, wherein the electrode array comprises indium tin oxide (ITO) or indium zinc oxide (IZO).

6. The system as claimed in claim 1, wherein a shape of the first touch area comprises a circle, an ellipse, a square, a rectangle, a triangle or a polygon.

7. The system as claimed in claim 1, wherein the first touch area has a width of between 5 to 15 mm.

8. The system as claimed in claim 1, wherein the electrode array further comprises a second touch area, and the second touch area is electrically insulated from the first touch area.

9. The system as claimed in claim 1, wherein a shape of the electrode array comprises a circle, an ellipse, a square, a rectangle, a triangle or a polygon.

10. The system as claimed in claim 1, further comprising a display, wherein the display comprises the touch display panel.

11. The system as claimed in claim 10, wherein the display is a liquid crystal display.

12. The system as claimed in claim 10, wherein the display is an electroluminescent display.

13. The system as claimed in claim 10, further comprising an electronic device, wherein the electronic device comprises:
 the display; and
 an input unit coupled to the display to provide input to the display such that the display displays images.

14. The system as claimed in claim 13, wherein the electronic device comprises a mobile phone, digital camera, personal data assistant (PDA), notebook computer, desktop computer, television, car display or portable DVD player.

15. The system as claimed in claim 1, the second substrate comprises a thin film transistor (TFT).

16. The system as claimed in claim 1, wherein the plurality of touch areas are not defined by another electrode layer other than the same electrode layer in which the touch areas at X-axis direction and Y-axis direction are coplanar.

17. The system as claimed in claim 1, wherein at the display area 330, a first distance between the first and second common electrode layers is about 2 to 6 μm.

18. The system as claimed in claim 17, wherein at the peripheral area, a second distance between the first and second common electrode layers is about 5 to 7 μm.

19. The system as claimed in claim 18, wherein the first distance is 3 μm.

20. The system as claimed in claim 19, wherein the second distance is 5 μm.

\* \* \* \* \*